United States Patent
Clark et al.

(10) Patent No.: US 6,976,117 B2
(45) Date of Patent: Dec. 13, 2005

(54) SNOOPY VIRTUAL LEVEL 1 CACHE TAG

(75) Inventors: Lawrence T. Clark, Phoenix, AZ (US); Dan W. Patterson, Scottsdale, AZ (US); Stephen J. Strazdus, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 10/218,853

(22) Filed: Aug. 13, 2002

(65) Prior Publication Data

US 2004/0034756 A1 Feb. 19, 2004

(51) Int. Cl.[7] ............................................. G06F 12/08
(52) U.S. Cl. ........................................ 711/3; 711/118
(58) Field of Search .......................... 711/118, 3, 119, 711/120, 146

(56) References Cited

U.S. PATENT DOCUMENTS

| | | | | |
|---|---|---|---|---|
| 5,586,297 A | * | 12/1996 | Bryg et al. | 711/143 |
| 5,712,998 A | * | 1/1998 | Rosen | 711/205 |
| 5,809,562 A | * | 9/1998 | Gaskins et al. | 711/207 |
| 5,845,325 A | * | 12/1998 | Loo et al. | 711/135 |
| 6,079,003 A | * | 6/2000 | Witt et al. | 711/200 |
| 6,175,906 B1 | * | 1/2001 | Christie | 711/207 |
| 6,493,792 B1 | * | 12/2002 | Undy et al. | 711/108 |
| 6,629,207 B1 | * | 9/2003 | Yoshioka et al. | 711/125 |

* cited by examiner

*Primary Examiner*—Hiep T. Nguyen
(74) *Attorney, Agent, or Firm*—Lanny L Parker

(57) ABSTRACT

A processor system having cache array for storing virtual tag information and physical tag information and corresponding comparators associated with the array to determine cache-hits. Information from the virtual tag array and the physical tag array may be accessed together.

25 Claims, 4 Drawing Sheets

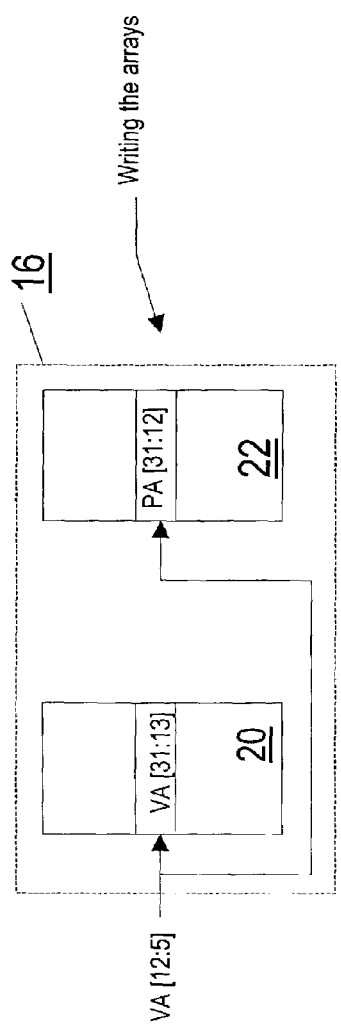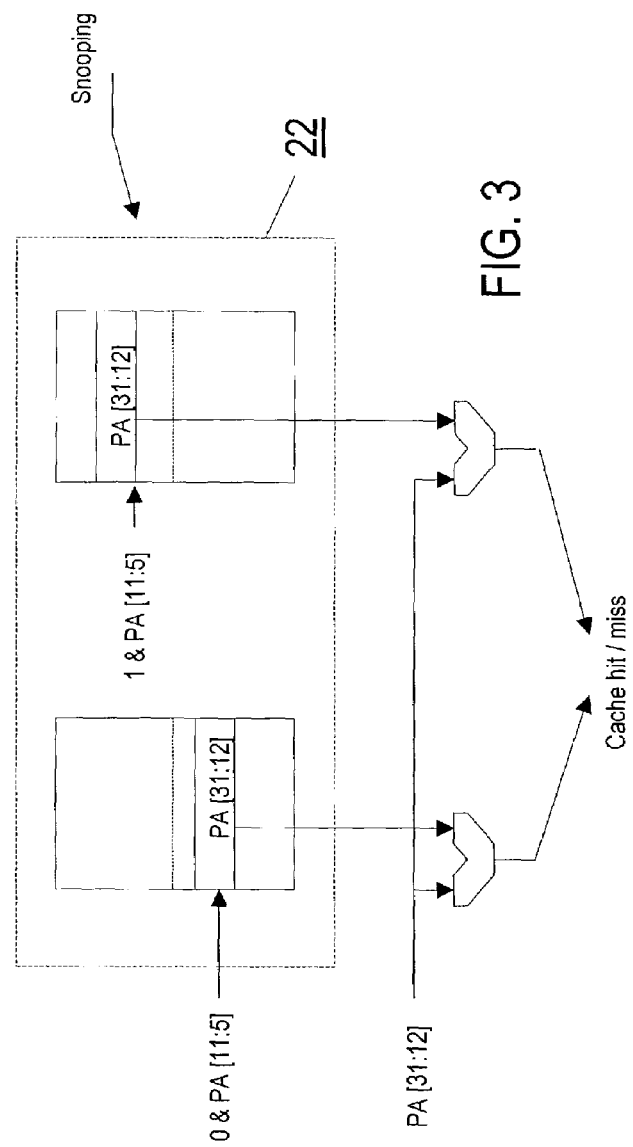

SNOOPY VIRTUAL LEVEL 1 CACHE TAG

The architecture of microprocessors generally includes an internal memory cache, often called a Level 1 (L1) cache, that is a Static Random Access Memory (SRAM) that provides high-speed data accesses. Most personal computers also include a Level 2 (L2) cache that is slower than the L1 cache. The L1 and L2 caches sit between the central processing unit and an external lower-speed main memory, which may be a Dynamic Random Access Memory (DRAM), and disk memory.

Memory caching in a computer system is effective because most programs exhibit spatial and temporal locality in accesses for data or instructions. By keeping the appropriate information in the high-speed L1 cache, the microprocessor avoids accessing the slower DRAM. In addition, the computer system may use virtually addressed caches in order to meet the memory requirements of a high-speed processor and avoid the potential slowdown of address translation before accessing the cache. Thus, virtual addressed caches allow faster processing when requested data is found in the caches, i.e., a cache-hit.

Virtually addressed caches are not used in some architectures despite their apparent simplicity because they have several potential pitfalls that need careful management. The core processor accessing the cache to retrieve recently used data presents a virtual address for the cache lookup, but the system outside the core processor typically uses a physical address to determine if the corresponding data is cached. Thus, a purported weakness of virtually addressed caches is their inability to support "snooping" which allows the system outside the core processor to inquire as to whether a memory address is within the internal cache of the core processor. When the cache is physically addressed, a translation from physical address to virtual address is required. A Translation Look-aside Buffer (TLB) may be used to speed up this process, but this adds additional latency.

With the internal cache addressed via virtual addresses and the external memory addressed via physical addresses, inconsistencies occur that may be overcome through additional hardware and multiple operation steps to access the internal cache. Accordingly, there is a continuing need for better ways to provide flexibility for operating a computer system that provides "snooping" to determine whether a memory address is within the internal cache of the core processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a diagram that illustrates writing the cache arrays of FIG. 1;

FIG. 3 is a diagram that illustrates snooping the cache arrays of FIG. 1;

Figure 1:
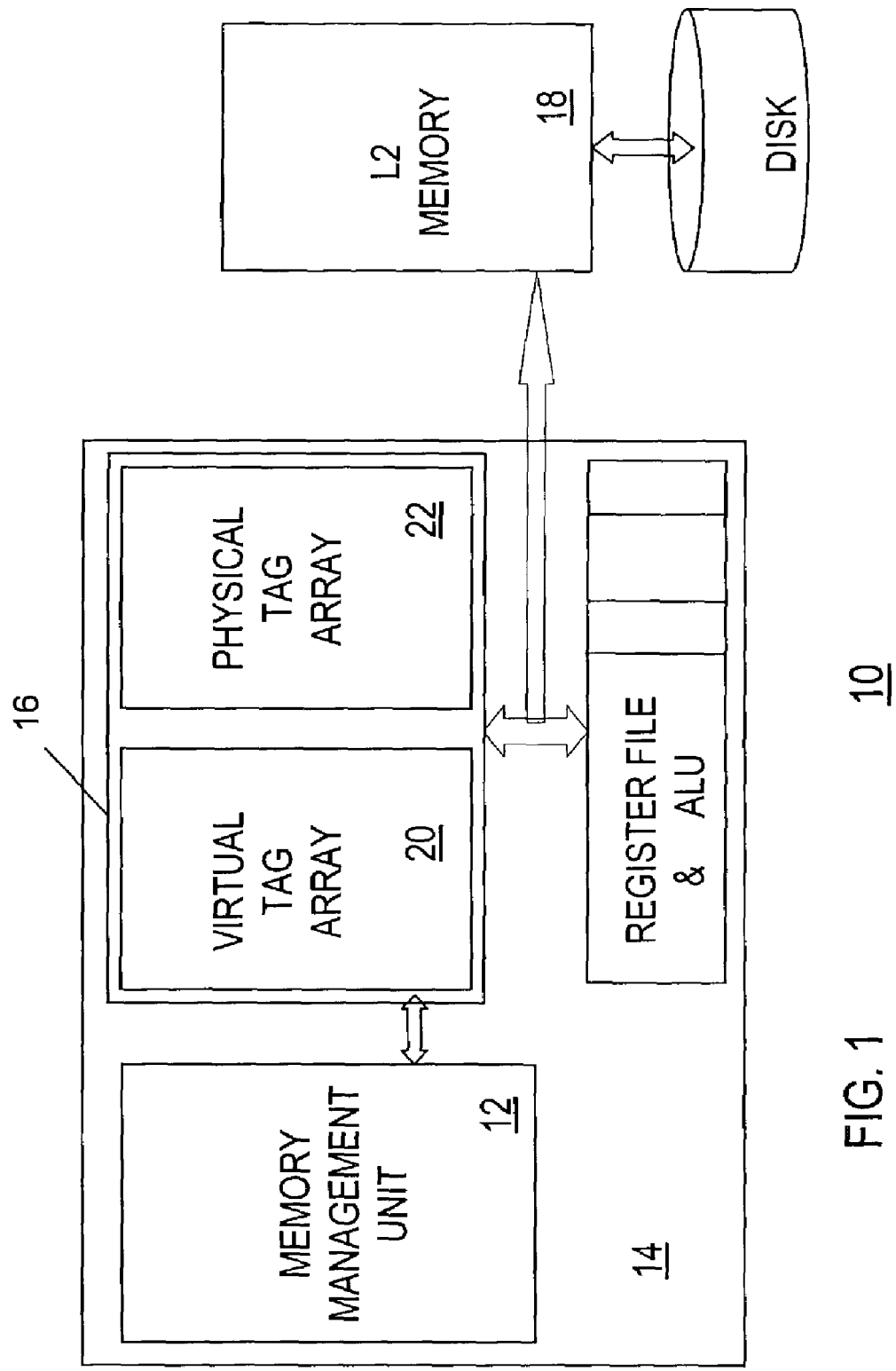
FIG. 1 illustrates a computer system having a virtual tag array and a physical tag array cache in accordance with the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the present invention may be used in a variety of applications. The circuits disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples. Although the present invention is not limited in this respect, any number of Operating Systems (OSs) such as Windows 95™, Windows 98™, and Windows NT™ from Microsoft Corporation in Redmond, Washington or UNIX™ from Bell Labs, may manage the physical memory present on the computer.

The present invention may also be included in integrated circuit blocks, and in general, the embodiments may combine microprocessor internal cache memory with external main memory and be incorporated into smart phones, communicators and Personal Digital Assistants (PDAs), base band and application processors, platform OS based devices, digital cameras, audio & video decoding, automotive infotainment, set top box and other products.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a computer system 10 having an Operating System (OS) that may manage the limited physical memory present on the computer, dividing the physical memory among many processes that may be running simultaneously and allocating each process an appropriate memory share. The OS running on a core processor 14 may rely on hardware support from a Memory Management Unit (MMU) 12 to manage the memory and export functions that other subsystems and applications may use to interact with the memory. An L1 cache memory may be divided into a physical address space and a virtual memory address space, with the size of each address space defined by the number of bytes and the number of bits in each byte.

It is desired that most of core processor 14 memory accesses come from an L1 cache, because the L1 cache operates at the processor frequency and has less latency than caches that are further from the core processor. Thus, the memory caching in computer system 10 utilizes an L1 internal memory cache 16 to reduce the number of times that core processor 14 accesses memory hierarchy further from the core, or the "off-chip" external main memory 18. An L1 cache miss may cause core processor 14 to go to an L2 cache or to main memory 18, potentially stalling the processor while waiting many instructions worth of time for a read from the L2 cache or main memory 18 to complete. The data from logical operations performed in an Arithmetic Logic Unit (ALU) in core processor 14 may be stored in cache 16 and memory 18.

Generally, the L1 internal memory cache 16 may be high-speed Static Random Access Memory (SRAM) while main memory 18 may be a slower Dynamic Random Access Memory (DRAM), although the type of memory is not a limitation of the claimed subject matter. Prior art may use virtually indexed physically tagged caches to allow snooping, typically using a dual port memory where one port receives addresses from the core and the other port receives snoop accesses from external agents. Snooping allows the agent outside of core processor 14 to inquire as to whether a memory address is within internal memory cache 16 of the core processor.

In contrast, the present invention provides a cache 16 having a virtual tag array 20 to store virtual addresses and a physical tag array 22 to store physical addresses, and thereby, provides an efficient "snooping" capability in accordance with the claimed subject matter. Core processor 14 may provide virtual addresses to cache 16 while the agent outside of core processor 14 may provide physical addresses to cache 16, but the circuit architecture employed allows snooping to occur without reliance on a Translation Lookaside Buffer (TLB). Further, storing the virtual and physical addresses in separate tag arrays allow address comparisons to more easily determine cache-hits. Embodiments of the claimed invention that support snooping include a cache that may be virtually indexed, direct-mapped or an N-way set associative cache.

FIG. 2 is a diagram that illustrates writing the cache arrays of FIG. 1. Memory cache 16 has a virtual tag array 20 for storing N-bit wide tags and physical tag array 22 for storing (N+1)-bit wide tags. With the exception of the extra stored bit in physical tag array 22, there is a similarity between the arrays that allows a one-to-one correspondence between tag entries, with physical addresses stored in physical tag array 22 and virtual addresses stored in virtual tag array 20. The two arrays permit core accesses to compare addresses in a set-associative manner to tag array 20 containing the virtual addresses. Utilizing both split virtual tag array 20 and physical tag array 22, it should be noted that for a given virtual address the physical address may be stored in the corresponding location in the "sister" array containing the physical addresses.

Referring to both FIGS. 1 and 2, virtual tag array 20 and physical tag array 22 may both have an address partitioning that includes an "index" portion, a "set" portion and a "tag" portion represented by bits ranging respectively from the least significant to the most significant address bits. Core processors that use a virtually indexed, physically tagged cache have some number of least significant address bits that are the same between the virtual and physical addresses. The actual number of bits that do not differ is a function of the page size, so that a 4 Kilo-Byte (KB) page, for example, the lower 12 bits of the virtual and physical addresses are the same. As shown in FIG. 2, an address partitioning that includes bits [4:0] for the "index" portion and bits [12:5] for the "set" portion remain the same for both virtual tag array 20 and physical tag array 22. In accordance with the present invention, virtual tag array 20 uses bits [31:13] to store the "tag" while physical tag array 22 uses bits [31:12] to store the "tag".

For a minimum 4 KB page size, the 13 lower address bits of the virtual address may be used to index both virtual tag array 20 and physical tag array 22 when writing new tags into the arrays. But it should be pointed out that only the 12 lower address bits remain the same between the virtual and physical addresses. To overcome this, (see FIG. 2) the physical tag written into physical tag array 22 includes the most significant of the lower 13 physical address bits, i.e., the physical address bit [12]. When a snoop occurs, (see FIG. 3) physical tag array 22 may be indexed using the lower 12 bits of the physical address, with the upper $13^{th}$ address bit set to a zero (or one) for one access and to a one (or zero) for another access. In other words, an additional bit may be concatenated as the most significant bit to the supplied physical address PA [11:5] and used (alternates binary values) to sequentially access physical tag array 22. The tag comparison takes into account the extra bit that was originally stored in order to decide which of the two accesses is the correct one for providing the cache hit/miss signal.

Therefore, at least one bit in physical tag array 22, i.e., bit 12 for this example, may be associated with both the set and the tag portions of the address. Note that the address partitioning for physical tag array 22 and virtual tag array 20 is provided as an example and that the present invention is not limited to this particular address partitioning. Put another way, a larger page size may have more than one bit associated with both the set and the tag portions of the address. In accordance with the present invention, snoop support for a virtually indexed direct-mapped or N-way set associative cache 16 may be provided without restricting the cache size to that of one page, or N pages respectively.

FIG. 3 is a diagram that illustrates snooping the cache arrays of FIG. 1. Physical tag array 22 is shown with (N+1)-bit wide tags that permits snoop accesses to compare physical addresses (PA) to the tag stored in physical tag array 22.

Figure 4:
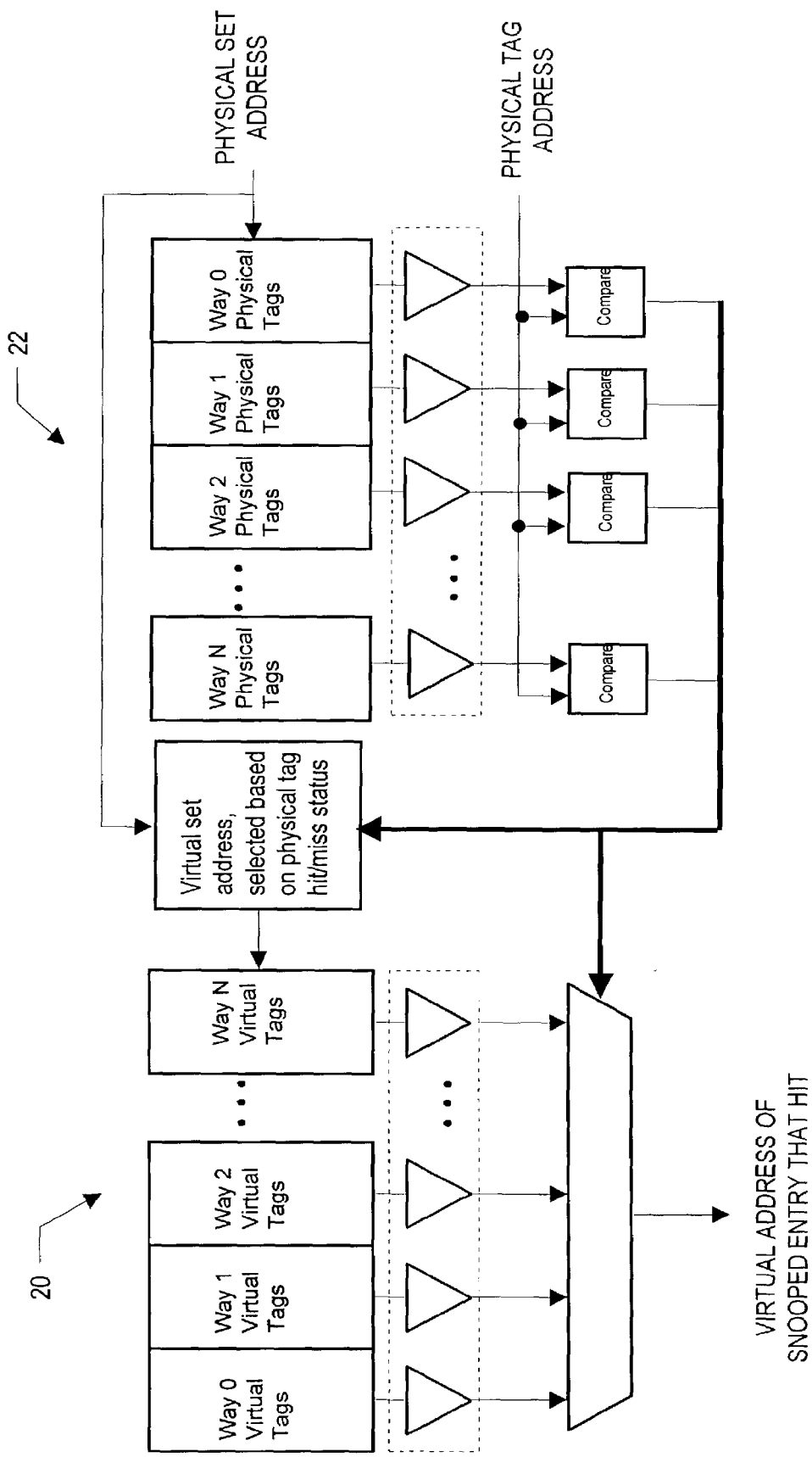
FIG. 4 illustrates the circuit architecture for the tag arrays of FIG. 3 that provides snooping through two sequential accesses.

FIG. 4 further illustrates a circuit architecture for the tag arrays that provide snooping through two sequential accesses to determine a cache hit. In this embodiment, virtual tag array 20 and physical tag array 22 include multiplexers, sense amplifiers and comparators. An agent external to core processor 14 may supply a physical address (both tag and set snoop address) to physical tag array 22. The supplied tag portion of the physical address, i.e., PHYSICAL TAG ADDRESS, is compared with the tag values stored in the set as addressed by PHYSICAL SET ADDRESS. Put another way, this embodiment for handling snoops has multiple snoop lookups in physical tag array 22 to determine which physical set address the entry is stored in. A cache-hit results in an access of virtual tag array 20 and physical tag array 22 to retrieve the snooped entry. Note that for this embodiment and using this circuit architecture, a snoop may be scheduled once every other cycle for the case where the snoop accesses occur in a serial fashion because sequential accesses may be used to check one and then the other physical tag array 22.

Figure 5:
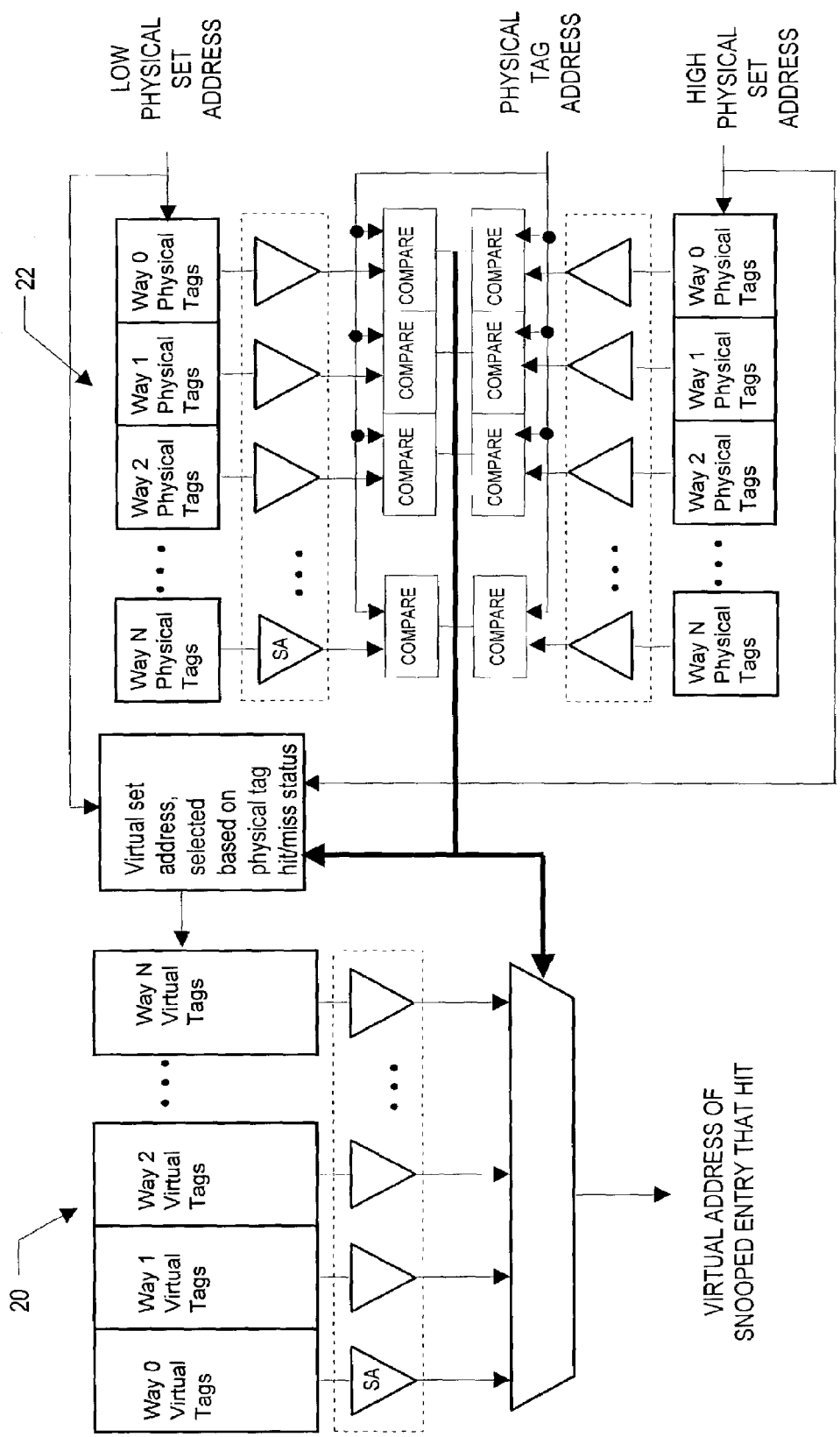
FIG. 5 illustrates the circuit architecture for the tag arrays of FIG. 2 that provides snooping in one access.

FIG. 5 illustrates the circuit architecture for cache 16 that provides snooping in one access. In this embodiment, additional multiplexers, sense amplifiers and comparators are added to physical tag array 22 that accommodate snoop operations on every cycle. Again, virtual tag array 20 may store N-bit wide tags and physical tag array 22 may store (N+1)-bit wide tags. The portion of physical tag array 22 that receives the LOW PHYSICAL SET ADDRESS has a zero concatenated to the physical set address supplied from the agent external to core processor 14. The portion of physical tag array 22 that receives the HIGH PHYSICAL SET ADDRESS has a one concatenated to the physical set address. In other words, a received physical set address may have the most significant bit stripped and a zero concatenated as the new most significant bit to provide the LOW PHYSICAL SET ADDRESS and a one concatenated to provide the HIGH PHYSICAL SET ADDRESS.

The tags from both portions of physical tag array 22 are compared with the PHYSICAL TAG ADDRESS to determine a cache-hit. Sufficient sense amplifiers and comparators are included in physical tag array 22 to look up both cases simultaneously. A cache-hit results in an access of virtual tag array 20 using the appropriate set from physical tag array 22 to retrieve the snooped entry. In other words, this embodiment for handling snoops has only one snoop lookup in physical tag array 22 to determine which set the entry is stored in. Note that two sets are simultaneously accessed to determine a cache-hit. In response to the cache-hit, the virtual address that corresponds to the snooped entry that hit is supplied at the input of virtual tag array 20.

By now it should be clear that embodiments have been presented that provide both writing and snooping a cache that improves system performance. Typically, core accesses cause a read of the virtual tag array, with information read and stored should a cache-hit be indicated. Similarly, snoop accesses cause a read of the physical tag array, with information read and stored should a cache-hit occur.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A cache, comprising:
A first array to store virtual tags and second array to store physical tags, wherein the first and second arrays allow address comparisons to determine cache-hits without reliance on a Translation Look-aside Buffer (TLB), and wherein the first and second arrays are accessed with a virtual address when writing the arrays and with a physical address when snooping.

2. The cache of claim 1, wherein the physical address supplied to the cache further includes a concatenated address bit having a first logic value in a first access and a second logic value in a second access.

3. The cache of claim 1 wherein the first array stores N bit tags and the second array stores at least (N+1) bit tags.

4. The cache of claim 1 wherein the first and second arrays provide snoop support for a virtually indexed direct-mapped cache without restricting a cache size to that of one page.

5. The cache of claim 1 wherein the first and second arrays provide snoop support for an N-way set associative cache without restricting the cache size to that of N pages.

6. A cache, comprising:
a virtual tag array and a physical tag array, where at least one bit used to provide a set address is included as a tag bit in the physical tag array.

7. The cache of claim 6 wherein the virtual tag array and the physical tag array have a one-to-one correspondence between tag entries, with physical tags stored in the physical tag array and virtual tags stored in the virtual tag array.

8. The cache of claim 6 wherein the virtual tag array stores tags of N bits and the physical tag array stores tags of at least (N+1) bits.

9. The cache of claim 6, wherein the virtual tag array and the physical tag array permit core accesses to compare addresses in a set-associative manner and provide a virtual address of a snooped entry for a cache hit.

10. The cache of claim 9, wherein the virtual address of a snooped entry for a cache hit is supplied by the cache in one access.

11. The cache of claim 6, wherein an address bit having a first logic value is concatenated to the physical set address and supplied to the physical tag array in a first access and a second logic value concatenated to the physical set address and supplied in a second access.

12. A cache, comprising:
a virtual tag array and a physical tag array that are accessed with a virtual address to write the arrays and a physical set address and a physical tag address for snooping, where a zero and one are concatenated to the physical set address to respectively access first and second portions of the physical tag array.

13. The cache of claim 12, wherein the snoop of the cache compares the physical tag address to a physical tag stored in the first and second portions of the physical tag array and a virtual address of a snooped entry that hit is supplied from the virtual tag array during one cache access.

14. The cache of claim 12, wherein the physical tag array further comprises:
first compare circuits to compare tags stored in the first portion with the physical address; and
second compare circuits to compare tags stored in the second portion with the physical address.

15. The cache of claim 12, wherein the virtual tag array receives the physical set address of a snooped entry from the physical tag array that hit to provide a virtual set address.

16. A system, comprising:
a processor;
a memory external to the processor; and
a processor based cache having a virtual tag array to store virtual addresses and a physical tag array to store physical addresses, where a virtual address of a snooped entry in the physical tag array is supplied for a cache hit.

17. The system of claim 16, wherein the virtual tag array stores N bit tags and the physical tag array stores at least (N+1) bit tags.

18. The system of claim 16 where first and second portions of the physical tag array are simultaneously accessed to determine a cache hit.

19. The system of claim 17, wherein a physical set address supplied to the processor cache further includes a concatenated address bit having a first logic value in a first access and a second logic value in a second access.

20. A processor based system, comprising:
a cache in a processor that has a virtual tag array and a physical tag array, where the physical tag array has first and second portions accessed by concatenating a zero to a set address to access the first portion and concatenating a one to the set address to access the second portion.

21. The processor based system of claim 20, wherein a physical address is compared to a physical tag stored in the first and second portions of the physical tag array during a same clock cycle.

22. The processor based system of claim 20, wherein the physical tag array stores tags that have at least one bit more than the tags stored in the virtual tag array.

23. A method, comprising:
   accessing a cache having a virtual tag array and a physical tag array without reliance on a Translation Look-aside Buffer (TLB) using a virtual address to address both arrays when writing and a physical address when snooping;
   comparing the physical address with a tag stored in the physical tag array to determine a cache hit; and
   providing the virtual address from the virtual tag array that is selected using the tag stored in the physical tag array corresponding to a snooped entry that hit.

24. The method of claim 23, further comprising:
   concatenating an address bit to the physical address, the address bit having a first logic value in a first access and a second logic value in a second access.

25. The method of claim 23, further comprising:
   concatenating an address bit to the physical address that allows comparing the physical address with the tag stored in the physical tag array in one cache access.

\* \* \* \* \*